Oct. 24, 1939.  H. H. PLATT  2,177,535
VARIABLE PITCH PROPELLER
Filed July 3, 1935  3 Sheets-Sheet 1

INVENTOR.
Haviland H. Platt
BY
Leonard L. Kalish
ATTORNEY.

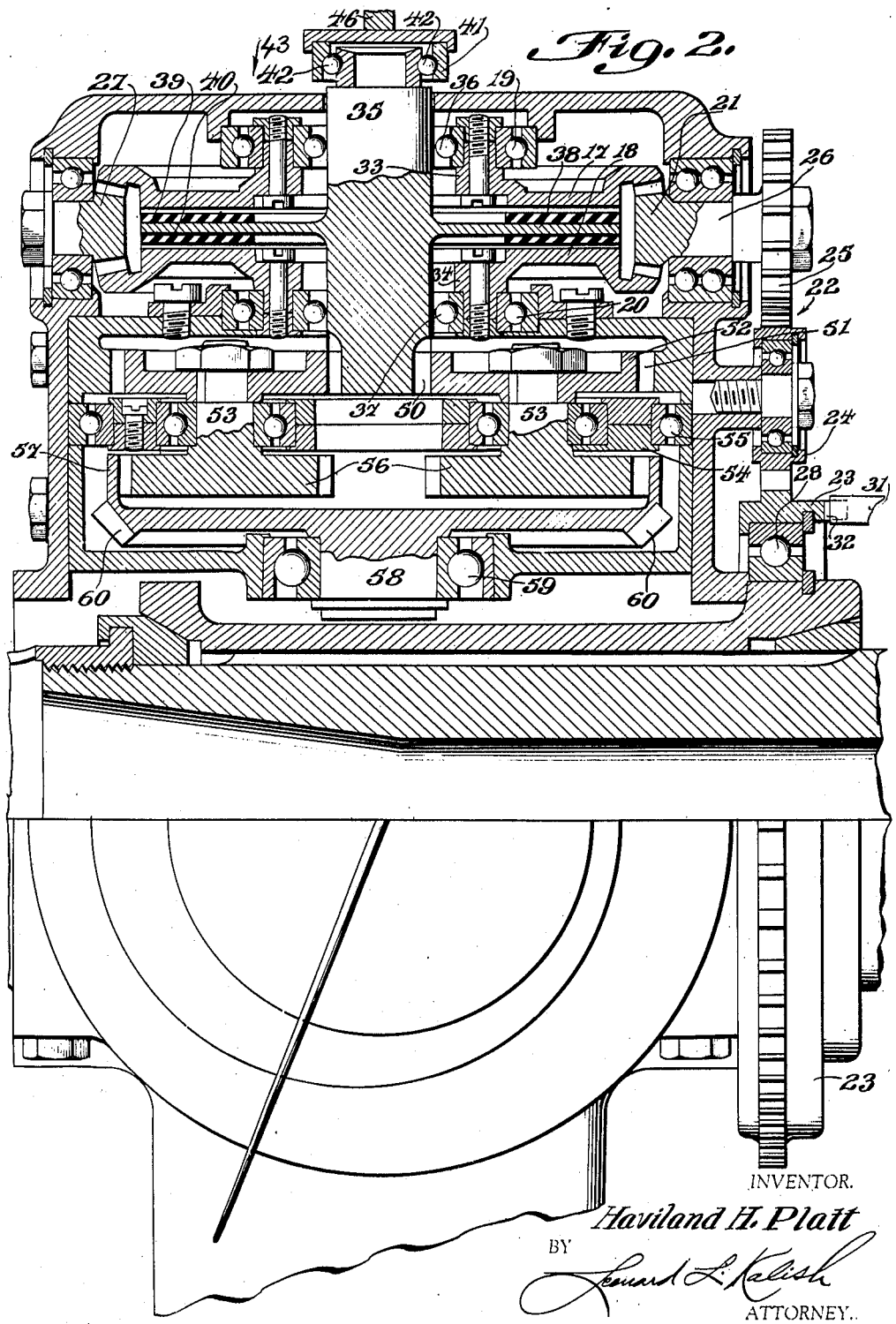

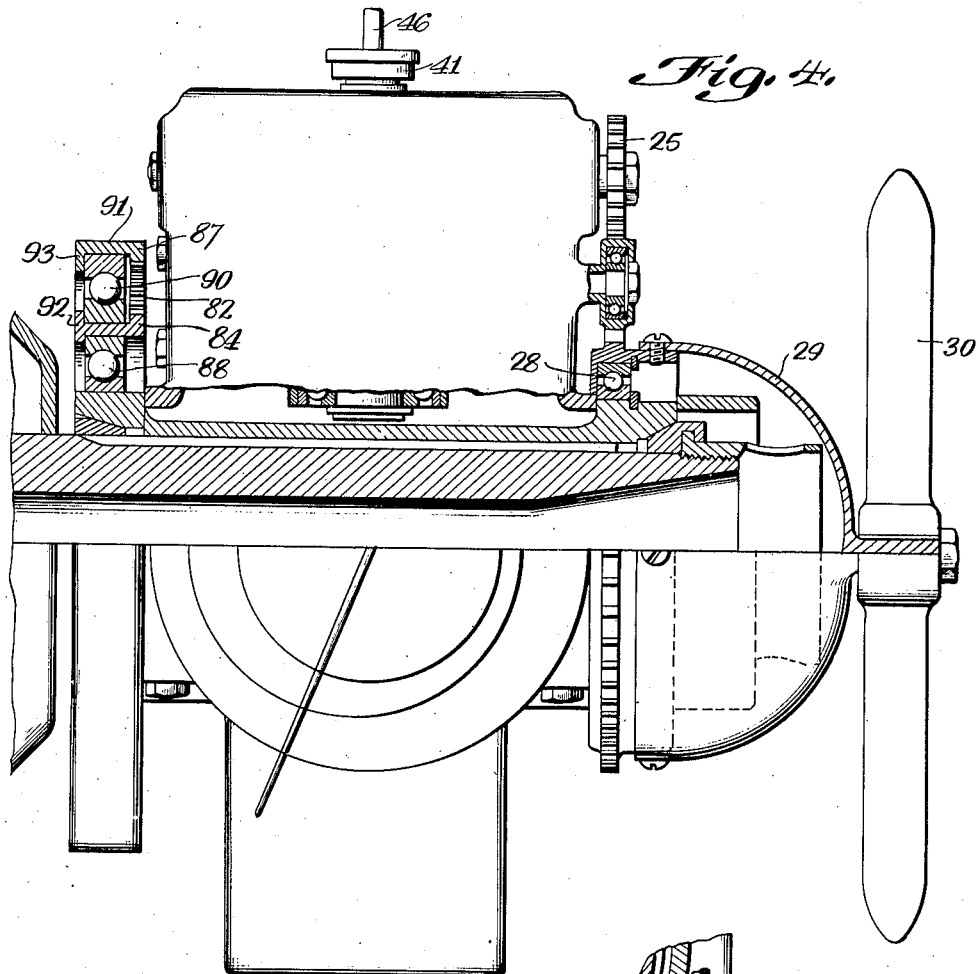
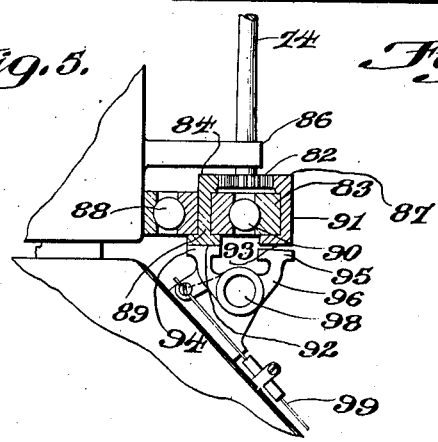
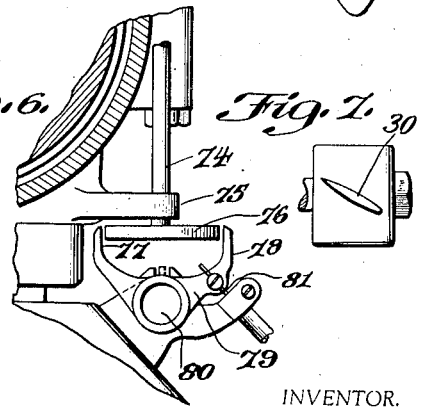

Patented Oct. 24, 1939

2,177,535

UNITED STATES PATENT OFFICE 2,177,535

VARIABLE PITCH PROPELLER

Haviland H. Platt, New York, N. Y.

Application July 3, 1935, Serial No. 29,584

11 Claims. (Cl. 170—163)

The present invention relates to certain new and useful variable pitch propeller constructions for aeronautic work, as for instance, for use as traction propellers or for lift propellers, or what are sometimes called rotors, or for other air-moving propeller-like structure, and it relates more particularly to variable pitch propeller or rotor constructions wherein the pitch may be automatically maintained and/or varied, and whereby manual control may be superimposed upon the automatic control at the will of the operator. The present invention further relates to certain novel mechanism or means for providing the necessary power for effecting the pitch changes desired, which means or mechanism (sometimes regarded as a servo mechanism), though capable of providing substantial power, will still be fully responsive or sensitive to both the automatic as well as the manual controls.

It is an object of the present invention to provide a variable pitch propeller or rotor which would automatically adjust itself in pitch in such a way as to tend to maintain constant engine speed or constant R. P. M., and which may be manually so adjusted as to cause it to maintain different speeds for different flight conditions and different requirements of maneuver, and which may also be manually so varied as to cause a pitch variation which will not be responsive to the speed of the propeller;—this latter being for the purpose of permitting a setting of the blades at a negative angle and the speeding up of the engine for braking or for slowing down the vehicle in landing, either as it is about to contact the ground or after it has contacted the ground to shorten the run, or for the purpose of setting the pitch of a propeller to a neutral or approximately 90° setting in the event of engine failure and engine stoppage while in flight to reduce the drag of the stalled propeller.

With the above and other objects in view which will appear more fully from the following detailed description and accompanying drawings, the present invention consists of a central hub or supporting structure adapted to be mounted upon the propeller shaft, rotor shaft, rotor pivot or the like, and having two or more propeller blades, or rotor blades pivotally mounted therein with the blade roots adapted to be engaged simultaneously for rotation in unison with each other, a servo mechanism for rotating the blades to effect their pitch variations, which servo mechanism derives its source of power as a result of the rotation of the propeller, either relative to the engine housing or relative to the air flowing past the propeller, and rotary-speed responsive means for activating said servo mechanism in either one of two directions, and manually operable control means for activating said servo mechanism in either one of two directions.

The present invention further consists of other novel features as well as forms and details of construction which will appear more fully from the following detailed description and accompanying drawings.

In the accompanying drawings in which like reference characters indicate like parts:

Figure 2 represents a fragmentary section on line 2—2 of Figure 1 on a somewhat enlarged scale.

Figure 4 represents another embodiment of the present invention showing the modified form of servo drive and showing the modified form of manual control.

Figure 5 represents a fragmentary top plan view of the manually operable control means.

Figure 6 represents a fragmentary top plan view of another form of manually operable control means embodying the present invention.

Figure 7 represents an end view of the servo drive blade or servo drive impeller forming part of Figure 4.

Figure 1:
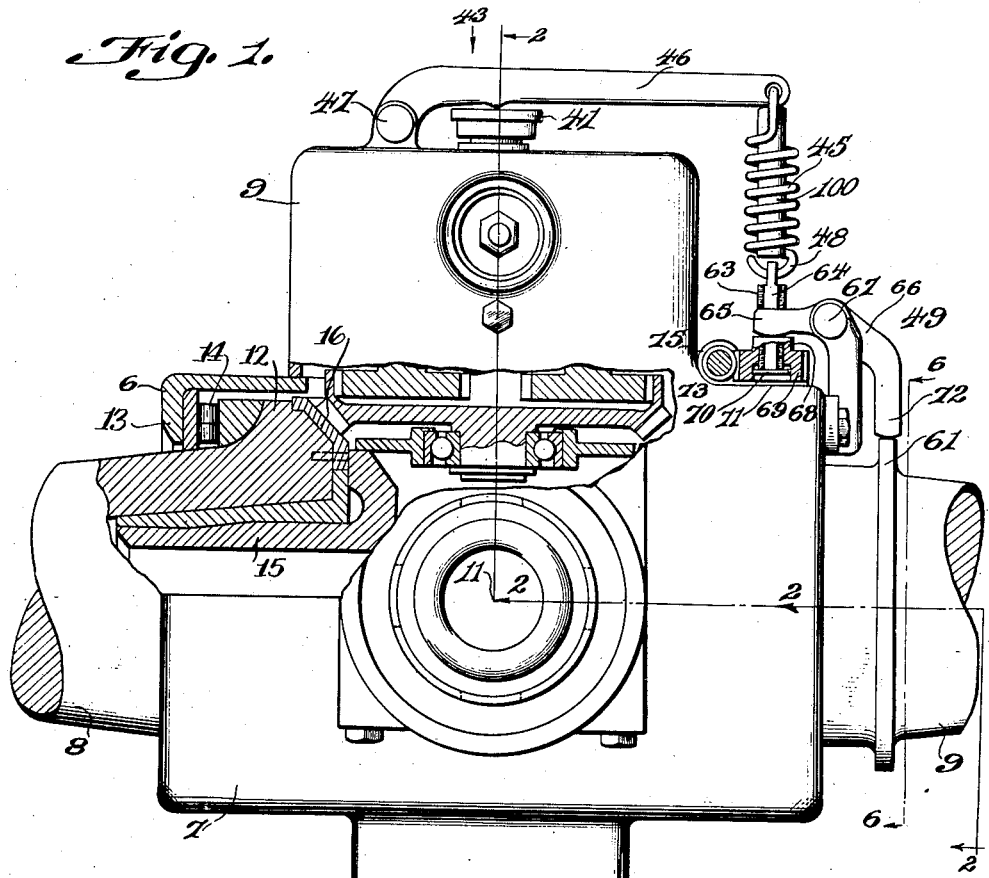
Figure 1 represents a front view (in the direction of the axis of rotation) of a propeller or rotor embodying the present invention with the propeller blades shown on either side broken away.

The propeller or rotor of the present invention is formed with any suitable hub housing shown particularly in Figure 1, which is preferably formed in two halves marked 6 and 7 respectively, or which may be otherwise suitably divided for assembly or construction purposes, and having the blades 8 and 9 rotatably mounted therein and having a servo housing 9 formed thereon either integrally or attached thereto at approximately a 90° angle, or at any other suitable point between the blades and having a suitable counterweight 10 generally opposite to the servo housing to counteract the centrifugal force of the servo mechanism upon the hub or upon the axis of rotation; the center 11 representing the center of rotation of the propeller or rotor structure.

The propeller blades may be pivotally mounted in any suitable manner, for instance, that shown in the sectional portion of Figure 1. Thus, the blade roots may be enlarged as at 12, and the hub housing flanged over as at 13, to interlock with the enlarged flange of the blade root, and any suitable anti-friction type of thrust bearing, as for instance, bearing 14 or the like interposed between the interlocking flanges of the blade roots and the hub housing. The hub structure may also be formed with blade lugs 15 projecting into the hollowed blade roots to give further alignment and pivotal support and pivotal bearing to the blade. Each blade root also carries fixedly attached thereto a bevelled gear 16 or a segment thereof of sufficient arcuate or circumferential extent to encompass the range of pitch variation or blade rotation desired.

Within the servo housing 9, two oppositely revolving driving clutch discs 17 and 18 are rotatably mounted about a common axis, that is, the axis of the servo housing;—these driving clutch discs being mounted upon any suitable anti-friction type bearings 19 and 20 carried by the housing structure as shown, or in any other suitable manner;—the two driving clutch discs 17 and 18 being driven constantly (while the propeller has rotational speed or while there is an air flow through the propeller axially thereof;— depending upon the type of power source used, as will be described more in detail hereinafter). By means of a bevelled pinion 21 at the delivery end of a suitable gear train or any suitable transmission train designated generally by the numeral 22, and including the driving ring gear 23, one or more driving pinions 24 and the driven gear 25 on the shaft or spindle 26 which carries the driving pinion 21. One or more similar driving bevelled pinions 27 may also be interposed in circumferentially distributed relation to the driving pinion 21 to balance the thrust of the driving pinion. The driving ring gear 23 is rotatably mounted upon the hub structure, as for instance, by the ball bearing or any other suitable anti-friction bearing 28. To give motion to the gear train 22 and hence to the driving clutch discs 17 and 18, the driving ring gear 23 is maintained in motion relative to the propeller hub either by anchoring the same (through interlocking lugs 31, 32 or otherwise) to the stationary engine housing, as in the form shown in Figure 2, or by placing the gear train 22 at the front of the hub (as shown in Figure 4) instead of at the back (as in Figure 2) and affixing to it, through a suitable supporting spider 29, an impeller blade or device 30 with a slight negative angle from the neutral, so that it will develop substantial aerodynamic resistance to turning and thus give the ring gear 23 rotation relative to the propeller, and also to give the ring gear 23 rotation relative to the propeller even when the propeller has stopped completely, due to the slight angle of the blades of the impeller, (that is, so long as there is axial airflow, as for instance, whenever the craft has substantial air speed while the propeller is stopped).

In the modification shown in Figure 2, the ring gear 23 is merely mounted on the hub and a lug 31 projecting from the engine housing interlocks with any suitable lug 32 carried by the ring gear. If desired, however, the ring gear 23 may be mounted directly on or affixed directly to the engine housing, and merely projecting into meshing alignment with the rest of the gear train 22. In that case, the ball bearing 28 is naturally eliminated, because the ring gear member 23 would be carried rigidly from the engine housing by a series of rigid supports such as, for instance, the lug 31. Thus, for instance, by providing a plurality of lugs 31 circumferentially distributed and formed integrally with the ring 23, the ball bearing 28 and its races are eliminated.

Within the hub portions 33 and 34 of the clutch member 17 and 18, a driven clutch spindle 35 is mounted upon single-race ball bearings 36 and 37 respectively, or upon any other suitable bearing mountings, for free rotation and also for a slight axial to-and-fro movement, whereby the driven clutch disc 38 carried by the clutch spindle 35 (and being suitably faced with any suitable friction-facings 39 and 40) may be operatively floated between the two driving clutch members 17 and 18 and whereby it may be brought into contact with either one or the other alternately or maintained in between the two in an inoperative position, thereby to give the clutch shaft or spindle 35 alternately opposite rotational motion or to maintain the same without rotational motion, as the case may be. The clutch spindle 35 is provided with a terminal thrust cap or member 41 connected therewith through any suitable anti-friction type of thrust bearing, as for instance, the thrust ball bearing 42, whereby axial force may be exerted upon the spindle 35 in the direction of the arrow 43;—the thrust or force exerted from without (by means to be described hereinafter) being opposed and being generally balanced by the centrifugal force acting upon the mass of the clutch spindle 35 and the driven clutch disc 38 (and also acting upon certain other associated movable parts). The thrust exerted upon the driven clutch spindle in the direction of the arrow 43 may be provided by any yieldable means which will increase with the displacement in one direction and decrease with the displacement in the other direction, as for instance, any suitable spring such as the helical tension spring 45 exerting its force upon the driven clutch member 35 in an axial direction through any suitable lever or other transmission means 46 pivoted or otherwise suitably supported as for instance at 47;—an end 48 of the spring 45 being anchored to the variable or adjustable anchorage designated generally by the numeral 49 and to be described more in detail hereinafter.

By a suitable tensioning of the spring 45 (which tension may be varied or completely eliminated as the case may be, through the control means and variable anchorage 49 to be described more in detail hereinafter) the rotary speed (R. P. M.) at which the driven clutch member 38 will be balanced in an inoperative or intermediate position, can be regulated or determined because, as will be pointed out more in detail hereinafter, if the force exerted upon the clutch member by the spring 45 is greater than the centrifugal, it will be moved into contact with the driving clutch member 18, while if the centrifugal force is greater, it will be moved into contact with the driving clutch member 17, thereby imparting to the driven clutch member 38 either one of two opposite rotary motions which in turn causes a variation in the blade angle or blade pitch in a direction to correct the discrepancy between the rotary speed of the propeller and the spring tension by increasing or decreasing the aerodynamic resistance upon the blades.

This blade pitch variation is accomplished by a compact reduction gearing of the epicyclic or other suitable type whereby the rotation of the driven clutch spindle 35 is transmitted through a sufficiently great mechanical ratio to the blade roots to impart to such blade roots opposite rotary motions proportional to but much smaller than the rotary motion of the driven clutch spindle 35 and with sufficiently increased force to make such blade rotations certain.

The reduction gear shown more particularly in Figure 2 consists generally of a driving pinion 50 carried on the end of the driven clutch spindle 35 and a coaxially arranged and generally aligned stationary internal ring gear 51 surrounding the same and one or more planetary pinions 52 operatively interposed between the driving pinion 50 on the clutch spindle 35 and the stationary internal ring gear 51;—the planetary pinions 52 being in turn journalled (through the short pivots or spindles 53) in a planetary ring or spider 54 which is rotatably mounted in the housing upon any suitable anti-friction bearing such as the ball bearing 55. The spindles 53 carry corresponding pinions 56 at their opposite ends which in turn mesh with the internal ring gear 57 carried by the pivot 58 journalled in the housing upon ball bearings or other suitable bearings 59. The internal gear 57 also carries the bevelled gear 60 which meshes with the bevel gears or bevel gear segments 16 on each of the blade roots 12 whereby the rotary motion of the driven clutch spindle 35 is transmitted oppositely but equally to the two (or more) propeller or rotor blades in proportion to the rotation of the clutch spindle 35 but much reduced in extent. The mechanical ratio between the clutch spindle 35 and the blade roots 12 may naturally be determined according to practical requirements of any installation and the number of teeth on the various pinions and gears of the reduction gearing may be determined accordingly;—no effort being made here to set out any special gear ratio or any special size gear teeth, et cetera, although merely for purposes of illustration, nine teeth on the pinion 50; twenty-three on each of the planetary pinions 52; fifty-five teeth on the stationary internal gear 51; twenty-two teeth on the planetary pinions 56, and fifty-four teeth on the moving internal gear 57 will produce a mechanical ratio of 176 to 1 in the positive direction between the driven clutch spindle 35 and the spindle 58 or the bevelled gear 60 which meshes directly with the bevelled gears on the blade roots.

It will thus be seen that for any tension-setting of the spring 45 (which is predetermined through the manual control to be described hereinafter, or by the stop dwells of the stop control cam 61) the pitch of the blades will be increased if the R. P. M. of the propeller increases, and the pitch of the blades will be decreased if the R. P. M. of the propeller decreases with respect to the R. P. M. corresponding to the spring tension so as to tend to maintain the propeller R. P. M. at the figure corresponding to the spring tension or spring condition.

Thus, by varying the spring tension or by altering the spring condition or tension condition of the spring, the R. P. M. to which the propeller will adjust itself automatically and in which the propeller will tend to maintain itself automatically can be set, while the propeller is in operation by turning the gear nut 69 through the shaft 74 and worm gear 75, by either one of the two manually operable mechanisms shown in Figures 5 and 6, the control wires or cables of which extend into the cock-pit, all as more particularly pointed out hereinafter.

In Figures 1, 5 and 6, a spring tension adjustment and control is illustrated (in several embodiments).

In each instance, however, the spring adjustment and control comprises two inter-related means, one of which varies the tension of the spring or the force of the spring according to the manual direction or manual control of the operator, while the other one varies or affects the force of the spring according to the blade angle setting;—the former being for the manual control of the R. P. M. (or indirectly the blade setting) while the latter being for the purpose of providing operative limits for the blade angle deflection or limits of pitch variation so that the pitch varying action of the clutch will be self-limiting within certain predetermined limits of blade variation so that the pitch adjusting action of the clutch will cease when certain blade angles are attained in either direction (that is, blade angles which in practice are found to be the limits of pitch setting desirable within the automatic pitch adjustment of the propeller). This latter spring tension or spring-force control may also be made to provide other predetermined pitch settings for certain conditions, as for instance, when the propeller has stopped completely while the craft still has substantial air speed, as for instance, to cause the blades to be set to a neutral angle under this condition.

The adjustable anchorage designated generally by the numeral 49 shown in Figure 1 is merely illustrative rather than descriptive of the general arrangement;—it being understood naturally that such structural details as go to the proper support and guidance of the operative parts have been largely omitted so as to minimize the parts to be shown and described here. The spring anchorage 49 includes an adjustment screw 63 having a suitable hole at one end through which the end 48 of the spring 45 may be threaded for positive connection. The screw or stem 63 may be provided with two flat sides 64 whereby the screw may be guided or retained against turning, although any other suitable conventional means may be provided for guiding the screw 63 against turning. In the illustration shown, however, the screw 63 is embraced, along its flat sides by the two parallel-faced prongs of the forked end 65 of a bell-crank or other suitable lever 66 pivoted at 67 with the spaced parallel sides of the prongs being sufficiently close to the flat side 64 of the screw to prevent it from turning without, however, interfering with its longitudinal movement. The screw 63 is threaded through a correspondingly threaded internal and axial hole in the hub portion 68 of any suitable worm gear 69 and is provided with a head 70 at its end to act as a stop for the threading of the screw 63 and worm gear 69 relative to each other: In one direction the stop 70 abuts the inner shoulder in the gear 69, while in the opposite direction it may abut the housing 6 as for instance, at the point 71. It is to be understood, however, that other suitable stops may be provided for this purpose.

Thus, for instance, by making the pitch of the screw 63 sufficiently great (using multiple thread screw, if necessary), the full adjusting relationship between screw and worm gear may be effected in just slightly less than a full revolution of the worm gear, so that a stop may be put on the worm gear which will prevent it from rotating too far in either direction. In that case, it may be necessary to increase the mechanical ratio between the driving means and the worm gear.

The forked end 65 of the lever 66 bears against the hub of the worm gear 69, and combined with such worm gear, constitutes the spring abutment or anchorage for the spring 45. The opposite end 72 of the lever 66 is in the nature of a cam follower which rides on and is yieldably maintained in contact with the periphery of the cam 61 provided on the root of one of the blades, as for instance, the blade 9, so that a rise or fall of the cam 61 will produce a corresponding increase or decrease in the tension of the spring 45. Independently of any setting of the lever 66 and supplemental to such setting, the spring tension is then further variable by turning the worm gear 69 in either one of two directions through the driving worm 73 constantly in mesh therewith, which in turn is carried by a shaft 74 journalled in suitable bearings 75. The shaft 74 may be turned in either one of two directions by the operator through any suitable control, as for instance, that illustrated in Figure 5; or that illustrated in Figure 6, as the case may be, or by any other suitable manually controllable operating means.

In the embodiment shown in Figure 6, the shaft 45 is provided with a friction disc or wheel 76, the periphery of which is adapted to be engaged from either one of two diametrically opposite points by either one or the other of the two contact shoes 77 or 78 carried on the ends of the rocker arm 79 pivoted at 80;—the rocker arm 80 being in turn controlled through any suitable cable control 81 or any other suitable control extending to the cockpit within reach of the pilot. When the rocker arm is deflected in one direction (by means of the manually operable cable control) the outer shoe 78 will momentarily contact the periphery of the friction wheel with each revolution of the propeller and then impart a slight rotary motion to the friction wheel and shaft 74 with each revolution of the propeller. When the bell crank lever 79 is deflected in the opposite direction, the other shoe 77 will contact the periphery of the friction wheel 76 momentarily with each revolution of the propeller and will cause an opposite rotation of the shaft 74, thereby increasing or decreasing the spring tension through the rotation of the worm gear 69 to any desired extent;—depending only upon the length of time that either one or the other of the two oppositely acting friction shoes is held in operative relation to the friction wheel.

In order to lengthen the contact between the shoes 77 and 78 and the friction wheel 76, the contact faces of the shoes 77 and 78 may be elongated along a curved path concentric with or coaxial with the axis of rotation of the propeller;—this elongation being of sufficient extent to give a prolonged contact between the shoe and the periphery of the friction wheel, and the approaching ends of these elongated shoes being preferably gradually tapered off or inclined so that the initial contact between the shoe and friction wheel may be more gradual and the shoes may be suitably faced with friction material to provide adequate gripping or frictional engagement with opportunity for slippage however, as in any clutch action.

In the embodiment shown in Figure 5, the shaft 74 is provided with a gear or pinion 82 which meshes with a ring gear 83 and is also indirectly geared to another ring gear 84 through one or more circumferentially distributed idler pinions (not shown) similar to the gear or pinion 82, though serving merely as idle interconnecting pinions and not having a shaft 74 connected therewith, and carried by suitable stationary pivotal supports 86, which mesh with the external ring gear 84 and the internal ring gear 87 which is generally formed integrally with the external ring gear 83. The ring gears 83 and 87 on one hand, and the ring gear 84 on the other hand may be rotatably supported upon the propeller hub by suitable anti-friction bearings, as for instance, the ball bearing 88 which supports the hub ring 89 of the ring gear 84 and the similar ball bearing 90 which supports the hub ring 91 of the ring gears 83 and 87.

The hub rings 89 and 91 are provided with generally transverse annular friction flanges 92 and 93, respectively, disposed generally at a right angle to the axis of rotation, which may be contacted by the brake shoes or friction shoes 94 and 95 respectively, carried on opposite ends of the bell crank lever 96 pivoted at 98;—this bell crank lever in turn being suitably controlled through the cable control 99 or other suitable manual control reaching to the cockpit within reach of the pilot. By a similar deflection of the bell crank lever in either one of two directions, either one or the other of the friction flanges 92 and 93 is engaged, causing a complete or partial stoppage of such friction flange or ring (depending somewhat upon the slippage or the pressure with which the brake shoe is applied) which, in turn, causes a relative rotation between the propeller hub and the external ring gear 83, and thus causes a rotation of the control shaft 74, so long as either one or the other of the brake shoes is applied. It will be understood that the deceleration of one of the flanges 92 or 93 (and the corresponding deceleration of the hub rings 89 and 91, respectively) produces a resultant rotation on the shaft 74 opposite to that produced by the deceleration of the other one.

Figure 3:
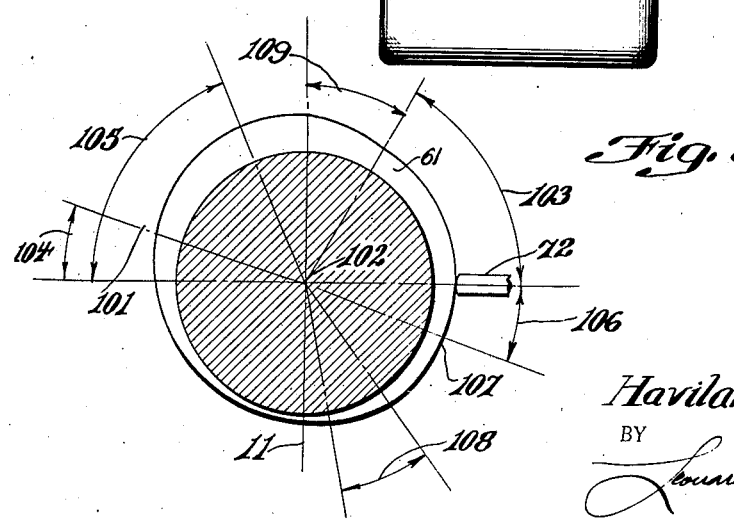
Figure 3 represents a cam outline or cam diagram of the stop control cam.

In order to release the spring tension entirely, as for instance, when the engine is throttled down completely and when the control cam 61 has rotated therefore to an angle which places the blade almost into the plane of rotation, or in order to release the spring tension whenever the cam 61 has reached a stop position, or whenever the manually operated spring control is advanced towards the spring releasing position sufficiently to warrant a complete spring release, a fixed spacer 100 or other equivalent means may be interposed between the spring anchorage 63 and the lever 46, so that when the spring tension is released either through the cam 61 or through the worm gear 69 to the point where the distance between the spring anchorage and the lever 46 is equal to the spacer 100, the spring tension is completely eliminated by the operative interposition of the spacer member. This may be desirable in order that the release of the spring tension may be obtained with much less change in spring tension than would otherwise be necessary. This also reduces the amount of throw required in the cam and the amount of turning required of the worm gear. In Figure 3, a more or less diagrammatic representation of the cam 61 is shown, although it is to be understood that the cam shape shown is merely illustrative, as the exact cam shape is a mere matter of particular design for any desired condition or construction within the scope of anyone skilled in machine design.

In Figure 3, the blade cord is designated by the line 101, and the axis of rotation of the propeller is represented by the numeral 11, while the axis of blade rotation and cam rotation is the center point 102.

The blade cord 101 is shown in this figure in what may be regarded as a minimum normal operative position. The cam portion 103 having a uniform radius dwell allows for pitch variations of that extent from what may be regarded as the main blade setting in normal operation. When the blade pitch is decreased below that, for instance, indicated by the angle 104 or when it is increased beyond that indicated by the angle 105, a corresponding cam follow or cam rise, respectively, is encountered by the cam follower 72, thereby decreasing the spring tension or increasing the spring tension respectively, so as to stop the further turning of the blade, and thereby forming a self-limiting stop to the blade turning in either direction.

When the spring tension has been completely released through the cam drop indicated over the angle 106, tension can again be imparted to the spring by the manual control means which can pull the anchorage screw down notwithstanding that the cam follower 72 has reached the low point or spring releasing point 107. When the tension is thus again imparted to the spring by the manual means, a further decrease of the blade angle may be effected until a negative blade angle is obtained for braking purposes or for decelerating the craft at landing. This blade angle decrease into the negative continues until the cam follower 72 goes down the second stop portion 108 of the cam which again releases the spring tension.

The mode of operation may be considered somewhat as follows:

In operation, that is, either while the propeller has rotation, as in the modification illustrated in Figure 2, or while the craft has air speed, as in the modification illustrated in Figure 4, the two driving clutch members 17 and 18 rotate continuously in opposite directions, and unless brought into contact with either of these two oppositely revolving clutch members, the driven clutch member 38 will be stationary in relation to the epicyclic or other reducing gear contained within the servile housing.

The centrifugal force on the driven clutch member 38 and its associated movable parts continuously urges the driven clutch member 38 towards the driving clutch member 17 while the propeller is in rotation and with a force dependent upon the speed of rotation of the propeller.

This centrifugal force tending to establish contact between the driven clutch member and the driving clutch member 17 is generally opposed by the force of the spring 45 except when such spring is completely released;—the opposing spring force being dependent upon the two more or less independent spring fittings (one through the cam and one through the worm gear). For every spring setting, there is a definite R. P. M. at which the spring force is balanced by the centrifugal force corresponding to that R. P. M. When this balanced R. P. M. is deviated from in either direction, the driven clutch member comes in contact with either one or the other of the driving member 17 or 18 depending on whether the R. P. M. has increased or decreased from the balanced R. P. M. and this in turn increases or decreases the blade angle to impose upon the blades more or less aerodynamic resistance;—the increase in blade angle giving it greater aerodynamic resistance to rotation, while the decrease of blade angle giving it less aerodynamic resistance to rotation. This self-adjustment or automatic adjustment of blade angle to maintain any predetermined R. P. M. takes place through the normal operation of the device so that by manually setting the spring tension, the R. P. M. of the propeller is automatically set or determined. When a device embodying the present invention is applied to an airplane of the now conventional type, the spring tension may be set manually to any predetermined amount and the throttle opened while the ship is on the ground and the blade angle will be brought to a relatively low angle which permits the desired R. P. M. to be obtained for advantageous take-off. As the craft gains forward speed and hence air speed, the aerodynamic resistance to rotation (for the given low blade angle) would be naturally decreased and hence, the propeller would tend to increase in speed. This, however, is automatically counteracted and compensated for by an automatic increase of blade angle as the speed of the craft increases, so that the aerodynamic resistance to rotation will be maintained substantially the same and the R. P. M. of the propeller maintained substantially the same, that is, the speed at which the engine may be expected to operate most effectively for the flight conditions, and thereby also setting the propeller to an angle which will make the propeller most effective for the particular air speed. Thus, it will be seen that as the air speed of the craft increases, a higher blade angle is desirable and is obtained in this automatic fashion. The converse will also follow that as the air speed of the craft is reduced in any condition of flight or maneuver, the blade angle will be correspondingly reduced so that the blade angle will be self-adjusting to any phase of flight operation or maneuver;—tending to maintain the R. P. M. constant.

As the desirable R. P. M. for different conditions of operation varies somewhat through the manual control the different desirable R. P. M.'s may be obtained. Thus, for instance, for cruising, a somewhat lower R. P. M. may be more desirable than for take-off, which as stated, can be effected by the manual control.

As the throttle is reduced or as the engine is throttled down to mere idling speed of the engine, without, however, reducing the R. P. M. setting of the pitch control mechanism, the blade angle will be decreased automatically in an effort to increase the R. P. M., but as the R. P. M. is then limited to the idling speed of the engine, the decrease of pitch continues until and only until the cam follower rides down the drop 106 of the cam 61 causing a release of the tension of the spring 45 and causing the driven clutch member to fly outwardly and away from the driving clutch member 18, thereby stopping the further decrease of blade angle and may possibly also bring the driven clutch member with the outer driving clutch member with more or less pressure thereby possibly to rotate the driven clutch member in the reverse direction slightly. The driven clutch member may oscillate to and fro or may stop in an intermediate position but still maintaining the minimum blade angle position. If while the engine is so idling, as for instance, on the ground or in any other phase of operation, the throttle should be closed, the driven clutch member may stop in an intermediate position but still maintaining the minimum blade angle position. If while the engine is so idling, as for instance, on the ground or in any other phase of operation, the throttle should be increased again, this will increase the R. P. M. and increase the blade angle until the R. P. M.

reaches the balanced point corresponding to the manually controlled spring setting.

If it is desired to utilize the power of the engine as a forceful brake to decelerate the forward motion of the craft, as for instance, at or after landing, so as to shorten the ground run, the manual control may be further operated in the direction of blade angle decrease until the blade angle goes through the position where the blade cord is in the plane of rotation, and then goes to a negative angle where it can be maintained with an open throttle until the cam follower reaches the lowest point of the cam when the spring tension is again released and preventing a further negative angle. In this position, a substantial braking effect may be obtained at relatively low R. P. M. but with a substantial throttle opening.

In the event of a dead engine, the drag of the propeller of the dead engine is undesirable, and to overcome this drag, it is desirable to set the blades into a neutral angle or a 90° pitch where the blade cord will be substantially parallel to the air flow. To effect this setting, the manual control can be operated in the direction of spring tension decrease, thereby increasing the blade angle until the cam follower rides onto the rise 109 which causes an increase of the spring tension and brings the blade increase to a stop at approximately 90°. This also is a self-limiting stop.

In the modification shown in Figures 1 and 2, the setting of the blade angle into this neutral position is dependent upon the actuation of the servo mechanism, which actuation in turn is dependent, in the modification shown in Figures 1 and 2, upon the continued rotation of the propeller, while in the modification shown in Figure 4, it is not dependent upon the rotation of the propeller but is dependent merely upon air flow relative to the craft, or relative to the impeller. Consequently, in this latter modification, the neutral setting can be effected even with a frozen engine while in flight.

It is to be understood that the drawings accompanying this description are merely illustrative of the invention, and that dimensions, proportions, and even details of construction may vary widely in actual construction, all within the scope of the ordinary skill of machine designers. Obviously, also, many of the means here shown can be replaced by any one of its several mechanical equivalents, some of which have been here shown, and most of which however, have not been shown or described. Likewise, while the present invention is shown and described here in relation to one type of propeller, it is to be understood that it is equally applicable to other types of propellers or rotors, both for propulsion and lift.

Having thus described the invention, what is hereby claimed as new and desired to be secured by Letters Patent, is:

1. A variable pitch propeller including a hub, a plurality of blades adjustably carried by said hub, a servo mechanism carried by the hub, said servo mechanism including a pair of oppositely revoluble and juxtaposed driving clutch members, external means for actuating said driving clutch members during normal operation, a driven clutch member operatively disposed between said pair of juxtaposed and oppositely revoluble driving clutch members, said driving clutch members and driven clutch member having a common axis disposed transversely of the axis of rotation of the propeller, said driven and driving clutch members being arranged for axial movement relative to each other for causing frictional engagement between either of said driving clutch members and said driven clutch member depending on the direction of relative displacement, operative connections between the roots of the blades and said driven clutch member, and yieldable means opposing the centrifugal force acting upon the axially movable clutch member to oppose its outward displacement.

2. A variable pitch propeller including a hub, a plurality of blades adjustably carried by said hub, a servo mechanism carried by the hub, said servo mechanism including a pair of oppositely revoluble and juxtaposed driving clutch members, external means for actuating said driving clutch members during normal operation, a driven clutch member operatively disposed between said pair of juxtaposed and oppositely revoluble driving clutch members, said driving clutch member and driven clutch member having a common axis disposed transversely of the axis of rotation of the propeller, said driven and driving clutch members being arranged for axial movement relative to each other for causing frictional engagement between either of said driving clutch members and said driven clutch member depending on the direction of relative displacement, operative connections between the roots of the blades and said driven clutch member, and yieldable means opposing the centrifugal force acting upon the axially movable clutch member to oppose its outward displacement, and manually operable control for varying the effectiveness of said yieldable opposing means.

3. A variable pitch propeller including a hub, a plurality of blades adjustably carried by said hub, centrifugally responsive servo mechanism carried by said hub transversely of the axis of rotation of the propeller for turning said blades about their respective axes, said servo mechanism including two oppositely rotating driving clutch members adapted to rotate continuously in the normal use of the propeller, and a driven clutch member adapted for frictional engagement only with said driving clutch members, the engagement and disengagement of said driven clutch member with either of said driving clutch members being effected by centrifugal force and a spring force opposed thereto.

4. A variable pitch propeller including a hub, a plurality of blades adjustably carried by said hub, and centrifugally responsive servo mechanism carried by said hub for turning said blades about their respective axes, said servo mechanism including a pair of oppositely revoluble driving clutch members adapted to revolve continuously in the normal use of the propeller, and a driven clutch member adapted for frictional engagement only with said driving clutch members.

5. A variable pitch propeller including a hub, a plurality of blades adjustably carried by said hub, and centrifugally responsive servo mechanism for turning said blades about their respective axes, said servo mechanism being generally eccentrically carried by said hub in the plane of rotation of said propeller and adapted to revolve about said propeller axis, and including mechanical driving means and centrifugally responsive blade-turning clutch means driven by said driving means, and connected by gearing with the roots of said blades, said clutch means being rotatable about an axis transverse to the axis of rotation of the propeller.

6. A variable pitch propeller including a hub, a plurality of blades adjustably carried by said hub, centrifugally responsive servo mechanism for turning said blades about their respective axes carried by said hub in the plane of rotation of said propeller and adapted to revolve about said propeller axis, and including mechanical driving means and centrifugally responsive blade-turning clutch means driven by said driving means and connected by gearing with the roots of said blades, said clutch means being rotatable about an axis transverse to the axis of rotation of the propeller, and an impeller for driving said blade-turning means.

7. A variable pitch propeller including a hub, a plurality of blades adjustably carried by said hub, centrifugally responsive servo mechanism for turning said blades about their respective axes carried by said hub in the plane of rotation of said propeller and adapted to revolve about said propeller axis, and including mechanical driving means and centrifugally responsive blade-turning clutch means driven by said driving means and connected by gearing with the roots of said blades, said clutch means being rotatable about an axis transverse to the axis of rotation of the propeller and an impeller for driving said blade-turning means, said impeller having a negative angle with respect to the propeller blade angle.

8. In fluid borne craft, a variable pitch propeller including a hub, a plurality of blades adjustably carried by said hub, servo mechanism carried by said hub for turning said blades about their respective axes, said servo mechanism including mechanically driven rotatable means arranged to be continuously rotated during forward movement of said craft and centrifugally responsive means connected to the roots of said propeller blades by gearing and arranged directly to engage and disengage said continuously rotated means, both the aforesaid means being rotatable about a common axis transverse to the axis of rotation of said propeller, and manual control means extending into the cockpit and operable while in flight for varying the rotary speed at which said centrifugally responsive means will operatively engage and disengage said continuously rotated means.

9. A variable pitch propeller including a hub, a plurality of blades adjustably carried by said hub, servo mechanism carried by said hub for turning said blades about their respective axes, said servo mechanism including rotary mechanical means associated with the propeller and continuously rotated by the rotation thereof for converting a portion of the rotational energy of the propeller into a source of energy constantly available for turning said blades about their respective axes, said mechanical means being continuously rotatable relative to the shaft of said propeller, and centrifugally responsive means connected to the roots of the blades by gearing directly engageable with and disengageable from said rotary mechanical means for varying the pitch of said blades, and manual control means extending into the cockpit and operable while in flight for varying the rotary speed at which said servo mechanism will respond to centrifugal force.

10. In a fluid borne craft, a variable pitch propeller including a hub, a plurality of blades adjustably carried by said hub, centrifugally responsive servo mechanism mounted on said hub for turning said blades about their respective axes, said servo-mechanism deriving its power mechanically and including actuating means rotatable about an axis transverse to the axis of rotation of said propeller, means for continuously rotating said actuating means upon movement of said craft, pitch-varying means generally permanently connected to the roots of said blades, and centrifugally responsive means rotatable about an axis in alignment with the axis of rotation of said actuating means for establishing temporary direct connection between said continuously rotated actuating means and said pitch-varying means, and manual control means for varying the rotary speed at which said servo mechanism will respond to centrifugal force.

11. A variable pitch propeller including a hub, a plurality of blades adjustably carried by said hub, servo mechanism carried by said hub for automatically maintaining generally constant rotary speed of the propeller by increasing the blade angle with any increase of speed above a predetermined speed setting of the propeller and for decreasing the blade angle with any diminution of speed below a predetermined speed setting of the propeller, said servo mechanism including a pair of continuously rotatable driving clutch members, means for simultaneously continuously rotating said clutch members, a centrifugally responsive driven clutch member adapted to individually frictionally engage either one of said continuously rotatable driving clutch members, resilient means opposing the centrifugal force acting upon said driven clutch member, and automatic means operatively associated with said resilient means for limiting the turning of the propeller blades about their respective axes in either direction to predetermined angular limits, and manually operable means extending into the cockpit and operable while in flight for varying the effectiveness of said resilient means, thereby to permit the blades to be rotated into predetermined angles or pitch settings at the will of the operator and irrespective of the automatic means limiting the turning of the propeller blades.

HAVILAND H. PLATT.